Patented Mar. 30, 1954

2,673,875

UNITED STATES PATENT OFFICE 2,673,875

DEHYDROHALOGENATION OF DIHALOPROPIONIC ACID COMPOUNDS

Harry D. Anspon, Easton, Pa., assignor to General Aniline & Film Corporation, New York, N. Y., a corporation of Delaware No Drawing. Application October 11, 1950, Serial No. 189,681

11 Claims. (Cl. 260—486)

This invention relates to an improved process for the preparation of esters, amides and nitriles of α-haloacrylic acids by dehydrohalogenation of the corresponding esters, amides and nitriles of a dihalopropionic acid in which at least one of the halogens occupies the α-position.

More specifically, the invention relates to the preparation of an ester of α-chloroacrylic acid by dehydrochlorination of the corresponding ester of α,β-dichloropropionic acid.

U. S. Patent 2,245,547 to Pollack discloses dehydrohalogenation of dihalopropionic esters with sodium, potassium, calcium or magnesium hydroxides, carbonates or bicarbonates, in the presence of water, preferably insufficient to form a solution of these inorganic compounds. However, this method has serious drawbacks in that the esters tend to saponify in the presence of these alkaline-reacting materials, and the process therefore requires that the alkaline dehydrohalogenating agent be added to the dihalopropionic ester at a rate corresponding substantially to the formation of the haloacrylic ester, that the ester produced be removed substantially as rapidly as it is formed, and that the amount of water present in the mixture be controlled to avoid an excess thereof. These conditions are difficult to maintain, and the process is therefore relatively unsuitable for commercial use.

According to U. S. Patent 2,476,528 to Barnes, many of the difficulties attending the Pollack procedure are obviated by employing, instead of the inorganic hydroxides and carbonates of Pollack, alkali metal, alkaline earth metal or ammonium salts of carboxylic acids, preferably sodium acetate. The dehydrohalogenation of dihalopropionic acid esters can be carried out in the presence of these carboxylic acid salts by heating a reaction mixture under reflux, said mixture containing them together with the dihalopropionic ester and sufficient water to dissolve or suspend the carboxy acid salt. The amount of water is no longer critical, and the tendency of the ester to saponify is negligible, so that it is unnecessary to add the salt at a rate corresponding to haloacrylic ester formation, nor to remove the haloacrylic ester as fast as it is formed.

Dehydrohalogenation according to the Barnes patent converts the carboxylic acid salt, e. g. sodium acetate, to free carboxylic acid. To isolate α-haloacrylic ester from the reaction mixture, the latter is treated, according to Barnes, with a mild aqueous alkaline reagent such as aqueous sodium bicarbonate to neutralize the carboxylic acid formed in the reaction. The ester is then separated from the mixture, washed with water, dried and purified by fractional distillation under reduced pressure.

Carboxylic acids such as acetic acid, liberated in the Barnes process, are soluble in the α-haloacrylic esters produced, and are also volatile on distillation. Omission of the neutralizing step would thus result in contamination of the ester distillate by the acid. Removal of the last traces of the contaminating acid either from the ester distillate or from the organic portion of the reaction mixture, by washing with water or treatment with mild aqueous neutralizing solutions is extremely difficult. Some of the contaminating acid therefore tends to remain in the product even after fractional distillation. The contaminating acid has a strongly depressing effect on the softening point of polymers produced from α-haloacrylic esters, and is therefore undesirable.

I have discovered that salts of polycarboxylic acids, in which at least two of the carboxyl groups are neutralized with an alkali or alkaline earth metal or ammonium, when employed for dehydrohalogenation of dihalopropionic esters in a reaction mixture of the type disclosed by Barnes, and in such proportions that at least two equivalents of the carboxy salt-forming metal or ammonium radical are present per mol of the dihalopropionic ester, yield reaction mixtures requiring no neutralization, and the α-haloacrylic ester produced can be recovered from the reaction mixture without the intervening neutralization step to remove contaminating acid. Thus, the product can be distilled directly from the reaction mixture and is found to be entirely free of contamination by the carboxy acid corresponding to the salt employed for dehydrohalogenation.

Moreover, I have discovered that the process of this invention can be carried out in a continuous manner by passing a liquid α,β-dihalopropionic ester progressively through an aqueous solution or suspension of the aforesaid polycarboxylic acid salt maintained at reaction temperature, and progressively distilling the product from the resulting reaction mixture. The aqueous polycarboxylic acid salt solution can be replenished as needed. The Barnes process cannot be similarly carried out in a continuous manner by reason of the necessity of neutralizing the mixture prior to distillation.

The α-haloacrylic acid ester produced can be recovered from the dehydrohalogenation mixture by separating the non-aqueous liquid phase thereof from the aqueous residue; extracting, if desired, with a non-polar solvent such as petroleum ether, or other volatile hydrocarbons, or ethers such as diethyl ether; washing with water; drying over a dehydrating agent such as anhydrous sodium sulfate, silical gel, or anhydrous alumina; and then subjecting to fractional distillation under reduced pressure. Alternatively and preferably, the α-haloacrylic ester produced can be distilled together with the water vapor from the reaction mixture, separated from the aqueous distillate, dried, and fractionally distilled under reduced pressure. The latter method of isolation is advantageously employed in the aforesaid continuous procedure.

The proportion of polycarboxylic acid salts employed in the reaction is at least sufficient to form a salt, upon completion of the reaction, in which at least one carboxyl group per mol of polycarboxylic acid is neutralized by the salt-forming metal or radical originally present therein. Thus, in the case of neutral salts of dicarboxylic acids, and acid salts of higher carboxylic acids in which only two of the carboxyl groups are originally neutralized, the minimum proportion required is 1 mol of polycarboxylic acid salt per mol of dihalopropionic acid ester. In the case of polycarboxylic acid salts having more than two carboxyl groups, and in which more than two carboxyl groups are neutralized, a correspondingly lower molecular proportion of the salt is required. For example, in the case of a neutral tricarboxylic acid salt, the minimum proportion is ⅔ mol thereof per mol of dihalopropionic acid ester. Additional amounts of polycarboxylic acid salt can be used in excess of the aforesaid minimum proportions but no substantial advantage is obtained thereby.

The reaction can be carried out at any suitable temperature, for example, from room temperature to about 150° C., superatmospheric pressure being employed at temperatures exceeding the boiling point of the reaction mixture. Ordinarily, it is most convenient to carry out the reaction at the boiling or reflux temperature of the reaction mixture.

Since the α-haloacrylic esters are susceptible to polymerization, it is generally desirable to include a small amount of polymerization inhibitor such as tertiary butyl catechol, hydroquinone, p-phenylene diamine, copper or copper compounds, in the reaction mixture, and to shield the mixture from actinic light in order to avoid polymerization of the product. It is also advantageous to carry out the reaction in the presence of an inert gas such as nitrogen.

My invention is illustrated by the following examples, wherein parts are by weight unless otherwise indicated.

*Example 1*

471 parts (3 mols) of methyl α,β-dichloropropionate containing 2.5 parts of tertiary butyl catechol, were added to an agitated solution of 434 parts (3 mols) of adipic acid neutralized with 240 parts (6 mols) of sodium hydroxide in 1000 parts of water at 80° C., in a reaction vessel shielded from actinic light and filled with an inert nitrogen atmosphere. The mixture was agitated and heated to boiling under reflux for one hour. The resulting mixture was then distilled over a period of two hours until no more droplets of water-immiscible condensate were observed in the aqueous condensate. The distillate, which was shielded from actinic light and contact with oxygen, separated into an upper aqueous and a lower organic layer, the latter amounting to 333.4 parts. The organic liquid product was dried over 9 parts of anhydrous magnesium sulfate. On analysis, it was found to contain 92.2% of methyl α-chloroacrylate, corresponding to an overall yield of 86% of theory, and to contain less than 0.6% of methyl α,β-dichloropropionate. Methyl α-chloroacrylate was readily recovered from this product in pure form by fractional distillation under reduced pressure.

*Example 2*

157 parts (1 mol) of methyl α,β-dichloropropionate containing 1.7 parts of tertiary butyl catechol, were added progressively over a period of one hour to a well agitated boiling solution of 146 parts (1 mol) of adipic acid, neutralized with 80 parts (2 mols) of sodium hydroxide in 700 parts of water, in a reaction vessel shielded from actinic light and filled with an inert nitrogen atmosphere. The methyl α,β-dichloropropionate was introduced under the surface of the boiling aqueous liquid such that it traversed eight inches of the solution before reaching the surface thereof for evaporation. The distillate from the reaction mixture was collected during the progressive addition of methyl α,β-dichloropropionate, whereby substantially no volatile organic compounds were permitted to accumulate in the reaction zone. No formation of polymer particles, which had occurred to a small extent in Example 1, was observed in the reaction vessel. The pH of the solution, originally 6, changed to 5 during the reaction. The organic layer which separated from the aqueous portion of the distillate amounted to 127 parts and was found to contain 50.9% of methyl α-chloroacrylate and 45.4% of unreacted methyl α,β-dichloropropionate. These values indicate a 54% conversion, and 84% theoretical yield of methyl α-chloroacrylate, and a 36% recovery of unchanged methyl α,β-dichloropropionate in the distillate.

A similar procedure, in which the methyl α,β-dichloropropionate was similarly introduced below the surface of the sodium adipate solution, except that the inlet was so placed that the ester traversed only two inches of the solution before reaching the upper surface thereof, yielded an organic distillate amounting to 133 parts, of which 34.9% was found to be methyl α-chloroacrylate and 57.4% methyl α,β-dichloropropionate. These values correspond to 38.5% conversion, a 72% yield of methyl α-chloroacrylate and 46.3% recovery of methyl α,β-dichloropropionate.

For purposes of comparison, 157 parts of methyl α,β-dichloropropionate were similarly added progressively to a boiling aqueous solution of 106 parts (1 mol) of sodium carbonate in 500 parts of water, and the distillate collected and separated into an aqueous and organic layer. The latter amounted to 100 parts, containing 36.3% of methyl α-chloroacrylate and 57% of methyl α,β-dichloropropionate. These values indicate only a 30% conversion, a 47% yield of methyl α-chloroacrylate, and a 36% recovery of methyl α,β-dichloropropionate.

*Example 3*

The procedure described in Example 1 was followed, except that instead of sodium adipate, an equivalent portion of sodium oxalate (i. e., 1 mol of the salt per mol of the methyl α,β-dichloropropionate) was employed. The proportion of water was increased by about 50% and the proportion of tertiary butyl catechol was doubled.

The organic layer of the distillate amounted to 37.3% of the weight of the methyl α,β-dichloropropionate originally employed, and was found to contain 41.9% of methyl α-chloroacrylate, and 53% of methyl α,β-dichloropropionate, corresponding to a conversion of 48%, a theoretical yield of 89%, and a recovery of 46% of the methyl α,β-dichloropropionate originally used.

In a second run, the same procedure was followed, except that the amount of sodium oxalate was doubled, i. e., 2 mols of a neutral salt per mol of methyl α,β-dichloropropionate. A similar amount of organic distillate was obtained, and found to contain 39.7% of methyl α-chloroacrylate, and 58.2% of methyl α,β-dichloropropionate. These values correspond to a conversion of 45%, a theoretical yield of 92%, and a recovery of 51% of methyl α,β-dichloropropionate.

*Example 4*

The procedure of Example 1 was followed, except that instead of sodium adipate, there was employed for each mol of methyl α,β-dichloropropionate, 0.73 mol of citric acid neutralized with 2 mols of sodium hydroxide, the amount of water being increased by about 20% and the amount of p-tertiary butyl catechol being doubled. The organic layer obtained from the distillate amounted to 75% of the methyl α,β-dichloropropionate originally employed, and was found to contain 78.9% of methyl α-chloroacrylate and 11.8% of methyl α,β-dichloropropionate. These values correspond to 77% conversion, 85% theoretical yield, and 9% recovery of methyl α,β-dichloropropionate.

Salts of polycarboxylic acids suitable for use in the process of this invention include the sodium, potassium, calcium, magnesium, strontium, barium or ammonium salts of adipic, citric, fumaric, maleic, malonic, naphthalic, oxalic, phthalic, succinic and tartaric acids, in which at least two carboxy groups per mol are neutralized by the salt-forming metal or radical. The water-soluble salts are preferred. The proportion of the salts employed is that indicated in the discussion preceding the examples.

The esters to which the process of this invention is applicable are those of α,α- and α,β-dichloro-, -dibromo-, and -diiodopropionic acids, but especially esters of α,β-dichloropropionic acid. They include the alkyl esters such as methyl, ethyl, propyl, isopropyl, butyl, amyl, isoamyl, N-hexyl, octyl, lauryl and octadecyl esters of the aforesaid acids. In addition, there may be mentioned the corresponding alkenyl esters such as allyl, methallyl, crotyl, oleyl, and chloroallyl esters. The process can also be applied to polyhydric alcohol esters of the aforesaid acids, e. g. to the glycol, glycerol, sorbitol, and mannitol esters, as well as to the aryl, aralkyl, cycloparaffinic and heterocyclic esters such as, for example, the phenyl, cresyl, resorcyl, naphthyl, benzyl, fenchyl, cyclohexyl and furfuryl esters. All of these esters yield the corresponding α-haloacrylic esters upon dehydrohalogenation by the procedure disclosed above and illustrated in the examples.

Moreover, the procedure of this invention is not only applicable to the esters of the aforesaid α,α- and α,β-dihalopropionic acids, but also to the corresponding nitriles, amides and N-mono- and di-substituted amides in which the nitrogen substituents can be aliphatic, araliphatic, cycloaliphatic, aromatic or heterocyclic, as, for example, mono- and dimethylamides, mono- and diethylamides, the β-hydroxy-ethylamides, the cyclohexyl- and cyclohexyl-methylamides, the benzyl- and benzylmethylamides, the anilide, the morpholide or piperidide of α,β-dichloropropionic acid. These compounds, like the esters, yield the corresponding nitriles, amides, N-substituted amides of the corresponding α-haloacrylic acids by the same procedure as that employed for the esters of these acids.

The α-haloacrylic esters and nitriles produced in accordance with this invention, which are volatile with steam, can be recovered from the reaction mixture by distillation. The relatively non-volatile amides or higher esters are best recovered by extraction of the reaction mixture with organic non-polar solvents which are immiscible or substantially immiscible with water.

Variations and modifications which will be obvious to those skilled in the art can be made in the specific procedures disclosed above without departing from the scope or spirit of the invention.

I claim:

1. In a process for the preparation of a compound of the class consisting of the esters, amides, and nitriles of an α-haloacrylic acid by dehydrohalogenating a dihalopropionic acid compound of the group consisting of the corresponding esters, amides and nitriles thereof, in which at least one of the halogens is in α- position, in the presence of water and a carboxylic acid salt of the group consisting of alkali metal, alkaline earth metal and ammonium salts, the improvement which consists in effecting said dehydrohalogenation with a salt of the group consisting of the alkali metal, alkaline earth metal and ammonium salts of polycarboxylic acids in which at least two of the carboxyl groups are neutralized by the salt-forming cation thereof, the amount of said salt being sufficient to provide at least two chemical equivalents of said salt-forming cation for each equivalent of dihalopropionic acid in said dihalopropionic acid compound; and removing the corresponding α-haloacrylic acid compound from the resulting aqueous polycarboxylic acid salt-containing reaction mixture.

2. In a process for the preparation of a compound of the class consisting of the esters, amides, and nitriles of an α-haloacrylic acid by dehydrohalogenating a dihalopropionic acid compound of the group consisting of the corresponding esters, amides and nitriles thereof, in which at least one of the halogens is in α-position, in the presence of water and a carboxylic acid salt of the group consisting of alkali metal, alkaline earth metal and ammonium salts, the improvement which consists in effecting said dehydrohalogenation with a salt of the group consisting of the alkali metal, alkaline earth metal and ammonium salts of polycarboxylic acids in which at least two of the carboxyl groups are neutralized by the salt-forming cation thereof, the amount of said salt being sufficient to provide at least two chemical equivalents of said salt-forming cation for each equivalent of dihalopropionic acid in said dihalopropionic acid compound; and distilling the corresponding α-haloacrylic acid compound from the resulting aqueous polycarboxylic acid salt-containing reaction mixture.

3. In a process for the preparation of a volatile α-haloacrylic acid ester by dehydrohalogenating the corresponding ester of a dihalopropionic acid in which at least one of the halogens is in α-position, in the presence of water and a carboxylic acid salt of the group consisting of alkali metal, alkaline earth metal and ammonium salts, the improvement which consists in effecting said dehydrohalogenation with a salt of the group consisting of the alkali metal, alkaline earth metal and ammonium salts of polycarboxylic acids in which at least two of the carboxyl groups are neutralized by the salt-forming cation thereof, the amount of said salt being sufficient to provide at least two chemical equivalents of said salt-forming cation for each equivalent of dihalopropionic acid in said dihalopropionic acid ester; and distilling the corresponding α-haloacrylic acid ester from the resulting aqueous polycarboxylic acid salt-containing reaction mixture.

4. In a process for the preparation of a volatile α-haloacrylic acid ester by dehydrohalogenating the corresponding ester of a dihalopropionic acid in which at least one of the halogens is in α-position, in the presence of water and a carboxylic acid salt of the group consisting of alkali metal, alkaline earth metal and ammonium salts, the improvement which consists in effecting said dehydrohalogenation by progressively adding said dihalopropionic acid ester in liquid form to a boiling aqueous reaction mixture containing said salt, maintaining contact between the liquid ester and the aqueous liquid phase of the reaction mixture during dehydrohalogenation, and progressively recovering the α-haloacrylic acid ester produced by condensing the vapors issuing from the reaction mixture, said salt being of the group consisting of the alkali metal, alkaline earth metal and ammonium salts of polycarboxylic acids in which at least two of the carboxyl groups are neutralized by the salt-forming cation thereof, the amount of said salt being sufficient to provide at least two chemical equivalents of its said salt-forming cation for each equivalents of dihalopropionic acid in said dihalopropionic acid ester.

5. In a process for the preparation of a volatile α-chloroacrylic acid ester by dehydrochlorinating the corresponding ester of α,β-dichloropropionic acid in the presence of an aqueous solution of a carboxylic acid salt of the group consisting of alkali metal, alkaline earth metal and ammonium salts, the improvement which consists in effecting said dehydrochlorination in an aqueous solution of a salt of the group consisting of the water-soluble alkali metal, alkaline earth metal and ammonium salts of polycarboxylic acids in which at least two of the carboxyl groups are neutralized by the salt-forming cation thereof, the amount of said salt being sufficient to provide at least two chemical equivalents of its salt-forming cation for each equivalent of dischloropropionic acid in said α,β-dichloropropionic acid ester; and distilling the corresponding α-chloroacrylic acid ester from the resulting aqueous polycarboxylic acid salt-containing solution.

6. In a process for the preparation of methyl α-chloroacrylate by dehydrochlorination of methyl α,β-dichloropropionate in the presence of an aqueous solution of a carboxylic acid salt of the group consisting of alkali metal, alkaline earth metal and ammonium salts, the improvement which consists in effecting said dehydrochlorination in an aqueous solution of a water-soluble salt of the group consisting of the alkali metal, alkaline earth metal and ammonium salts of polycarboxylic acids in which at least two of the carboxyl groups are neutralized by the salt-forming cation thereof, the amount of said salt being sufficient to provide at least two chemical equivalents of its salt-forming cation for each mol of methyl α,β-dichloropropionate, and distilling methyl α-chloroacrylate from the resulting aqueous polycarboxylic acid salt-containing solution.

7. In a process for the preparation of methyl α-chloroacrylate by dehydrochlorinating methyl α,β-dichloropropionate in the presence of an aqueous solution of a carboxylic acid salt of the group consisting of alkali metal, alkaline earth metal and ammonium salts, the improvement which consists in effecting said dehydrochlorination by progressively adding methyl α,β-dichloropropionate in liquid form to a boiling aqueous reaction mixture containing said salt in aqueous solution, maintaining contact between the liquid ester and the aqueous liquid phase of the reaction mixture during dehydrochlorination, and progressively recovering methyl α-chloroacrylate by condensing the vapors issuing from the reaction mixture, said salt being a member of the group consisting of water-soluble alkali metal, alkaline earth metal and ammonium salts of polycarboxylic acids in which at least two of the carboxyl groups are neutralized by the salt-forming cation thereof, the amount of said salt being sufficient to provide at least two chemical equivalents of its salt-forming cation for each mol of methyl α,β-dichloropropionate.

8. In a process for the preparation of methyl α-chloroacrylate by dehydrochlorinating methyl α,β-dichloropropionate in the presence of an aqueous solution of a carboxylic acid salt of the group consisting of alkali metal, alkaline earth metal and ammonium salts, the improvement which consists in effecting said dehydrochlorination by progressively introducing methyl α,β-dichloropropionate in liquid form into a boiling aqueous solution of said salt at a point substantially below the surface of the solution, and progressively recovering methyl α-chloroacrylate by condensing the vapors issuing from the reaction mixture, said salt being a member of the group consisting of water-soluble alkali metal, alkaline earth metal and ammonium salts of polycarboxylic acids in which at least two of the carboxyl groups are neutralized by the salt-forming cation thereof, the amount of said salt being sufficient to provide at least two chemical equivalents of its salt-forming cation for each mol of methyl α,β-dichloropropionate.

9. In a process for the preparation of methyl α-chloroacrylate by dehydrochlorination of methyl α,β-dichloropropionate in the presence of an aqueous carboxylic acid salt solution, the improvement which consists in effecting said dehydrochlorination in an aqueous solution of disodium adipate in an amount sufficient to provide at least two chemical equivalents of sodium for each mol of methyl α,β-dichloropropionate, and distilling methyl α-chloroacrylate from the resulting aqueous adipic acid salt solution.

10. In a process for the preparation of methyl α-chloroacrylate by dehydrochlorination of methyl α,β-dichloropropionate in the presence of an aqueous carboxylic acid salt solution, the improvement which consists in effecting said dehydrochlorination in an aqueous solution of sodium oxalate in an amount sufficient to provide at least two chemical equivalents of sodium for each mol of methyl α,β-dichloropropionate, and distilling methyl α-chloroacrylate from the resulting aqueous oxalic acid salt solution.

11. In a process for the preparation of methyl

α-chloroacrylate by dehydrochlorination of methyl α,β-dichloropropionate in the presence of an aqueous carboxylic acid salt solution, the improvement which consists in effecting said dehydrochlorination in an aqueous solution of a sodium salt of citric acid in which at least two of the carboxyl groups are neutralized by sodium, the amount of said salt being sufficient to provide at least two chemical equivalents of sodium for each mol of methyl α,β-dichloropropionate, and distilling methyl α-chloroacrylate from the resulting aqueous citric acid salt solution.

HARRY D. ANSPON.

References Cited in the file of this patent

UNITED STATES PATENTS

| Number | Name | Date |
|---|---|---|
| 2,476,528 | Barnes | July 19, 1949 |